United States Patent [19]
Henschen et al.

[11] Patent Number: 5,211,578
[45] Date of Patent: May 18, 1993

[54] CONNECTOR HOUSING ASSEMBLY FOR DISCRETE WIRES

[75] Inventors: Homer E. Henschen, Carlisle; Joseph Kurtz, Dauphin; Joseph M. Pawlikowski, Lancaster; Brian A. Wolfe, Jonestown, all of Pa.

[73] Assignee: AMP Incorporated, Harrisburg, Pa.

[21] Appl. No.: 884,791

[22] Filed: May 18, 1992

[51] Int. Cl.⁵ .............................................. H01R 9/07
[52] U.S. Cl. .................................... 439/494; 439/492; 439/885
[58] Field of Search ................. 29/857, 867, 858, 884; 439/492–499, 460, 462, 465

[56] References Cited

U.S. PATENT DOCUMENTS

| | | | |
|---|---|---|---|
| 4,256,945 | 3/1981 | Carter et al. | 219/10.75 |
| 4,626,767 | 12/1986 | Clappier et al. | 323/280 |
| 4,659,912 | 4/1987 | Derbyshire | 219/535 |
| 4,679,868 | 7/1987 | Hasircoglu | 439/495 |
| 4,682,828 | 7/1987 | Piper et al. | 439/92 |
| 4,701,139 | 10/1987 | Good et al. | 29/857 |
| 4,789,767 | 12/1988 | Doljack | 219/9.5 |
| 4,817,281 | 4/1989 | Sugawara | 29/857 |
| 4,852,252 | 8/1989 | Ayer | 29/860 |
| 4,871,319 | 10/1989 | Babow | 439/77 |
| 4,927,387 | 5/1990 | Eckler et al. | 29/867 |
| 5,123,859 | 6/1992 | Davis et al. | 439/405 |

Primary Examiner—David L. Pirlot
Attorney, Agent, or Firm—Anton P. Ness

[57] ABSTRACT

A connector (10) having two rows of signal terminals (20) is easily terminated to conductors (106) of discrete wires (14) by providing rear sections (28) of the terminals extending from the front housing member (30). A wire-carrying subassembly (130) having the discrete wires secured thereto is moved against the rear (36) of the front housing member (30) to place stripped conductor portions (108) adjacent the rear terminal sections (28) to be soldered. The wire-carrying subassembly (130) includes a body member (50) having upper and lower arrays of axial grooves (56) therealong between a front support ledge (60) and a rear support section (62), and upper and lower forward and rearward clamping bars (72,82) securable to the body member (50) to clamp the wires (14) thereto by clamping insulated end portions (104) forwardly of stripped conductor portions (108) within the grooves (56) and insulated wire portions behind the grooves, with the rear terminal sections (28) receivable into the grooves.

7 Claims, 6 Drawing Sheets

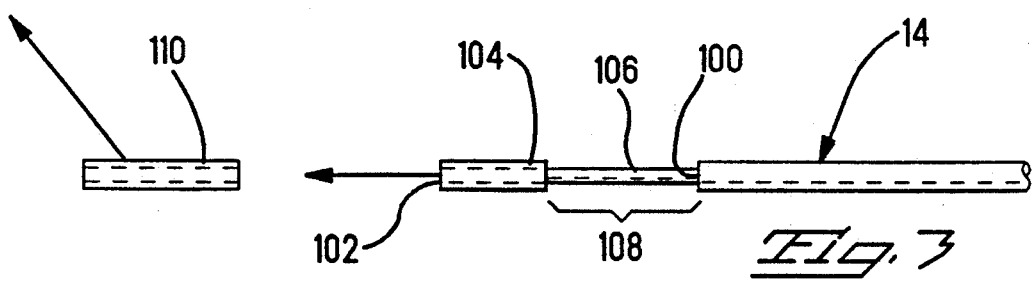
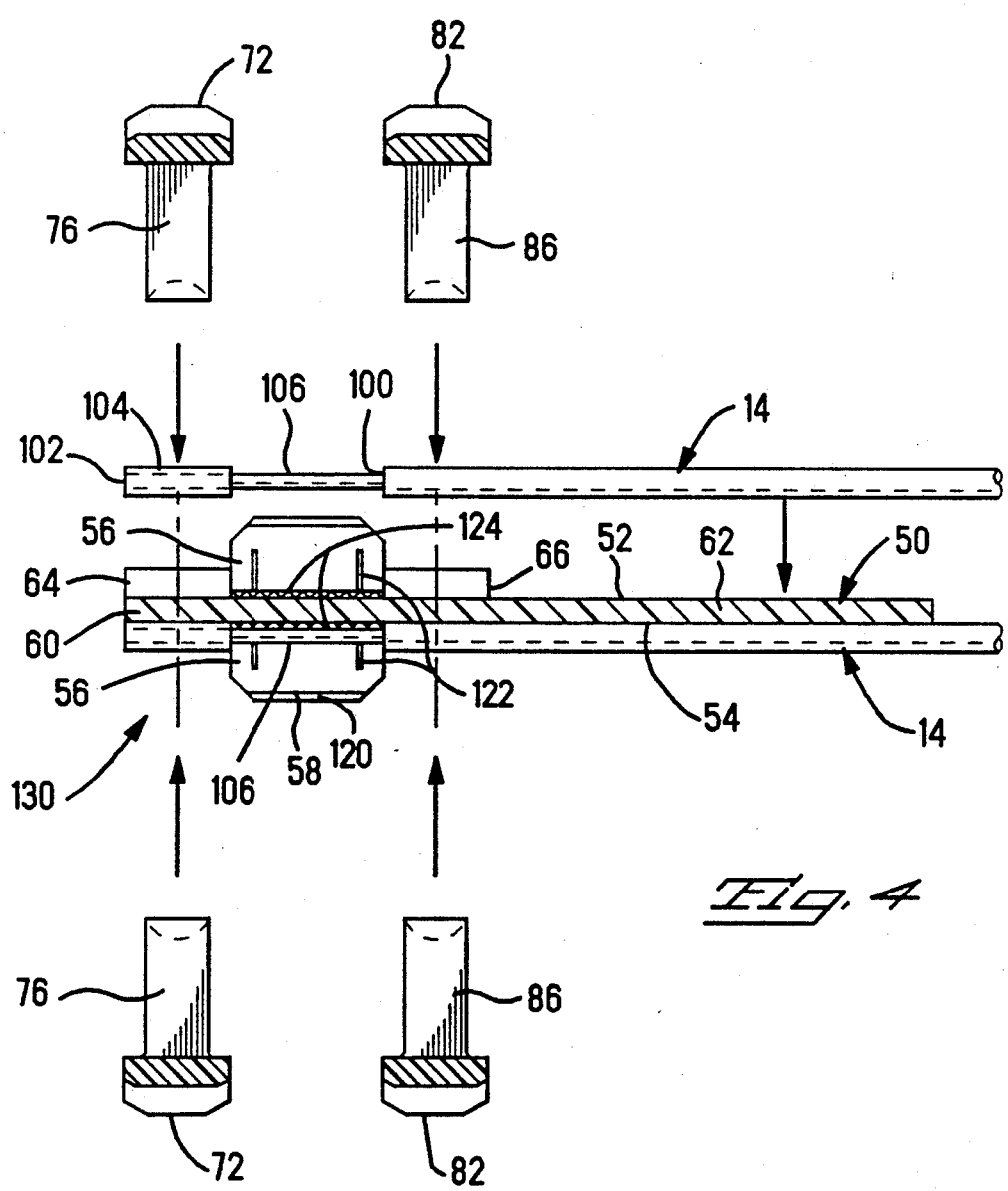

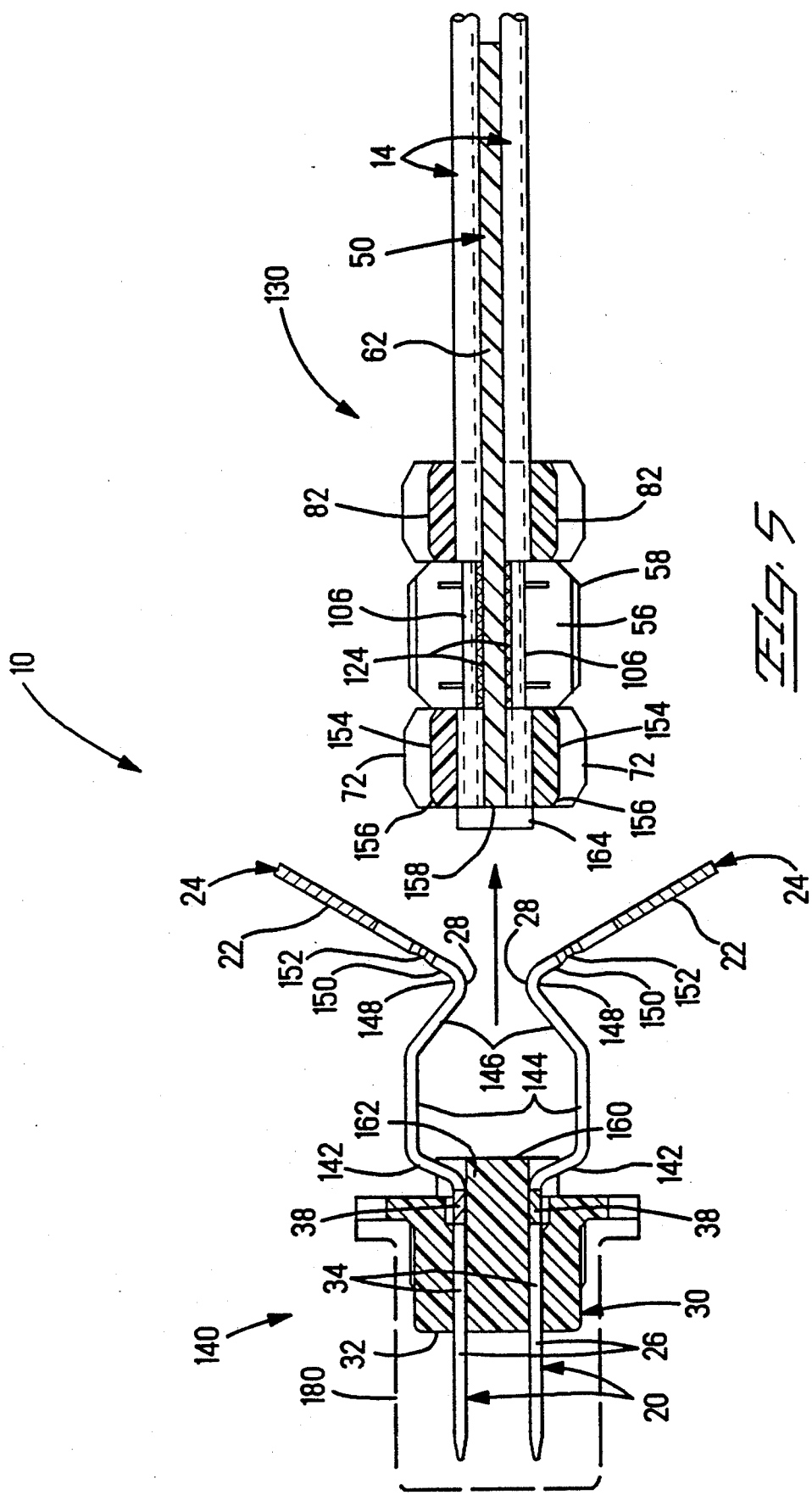

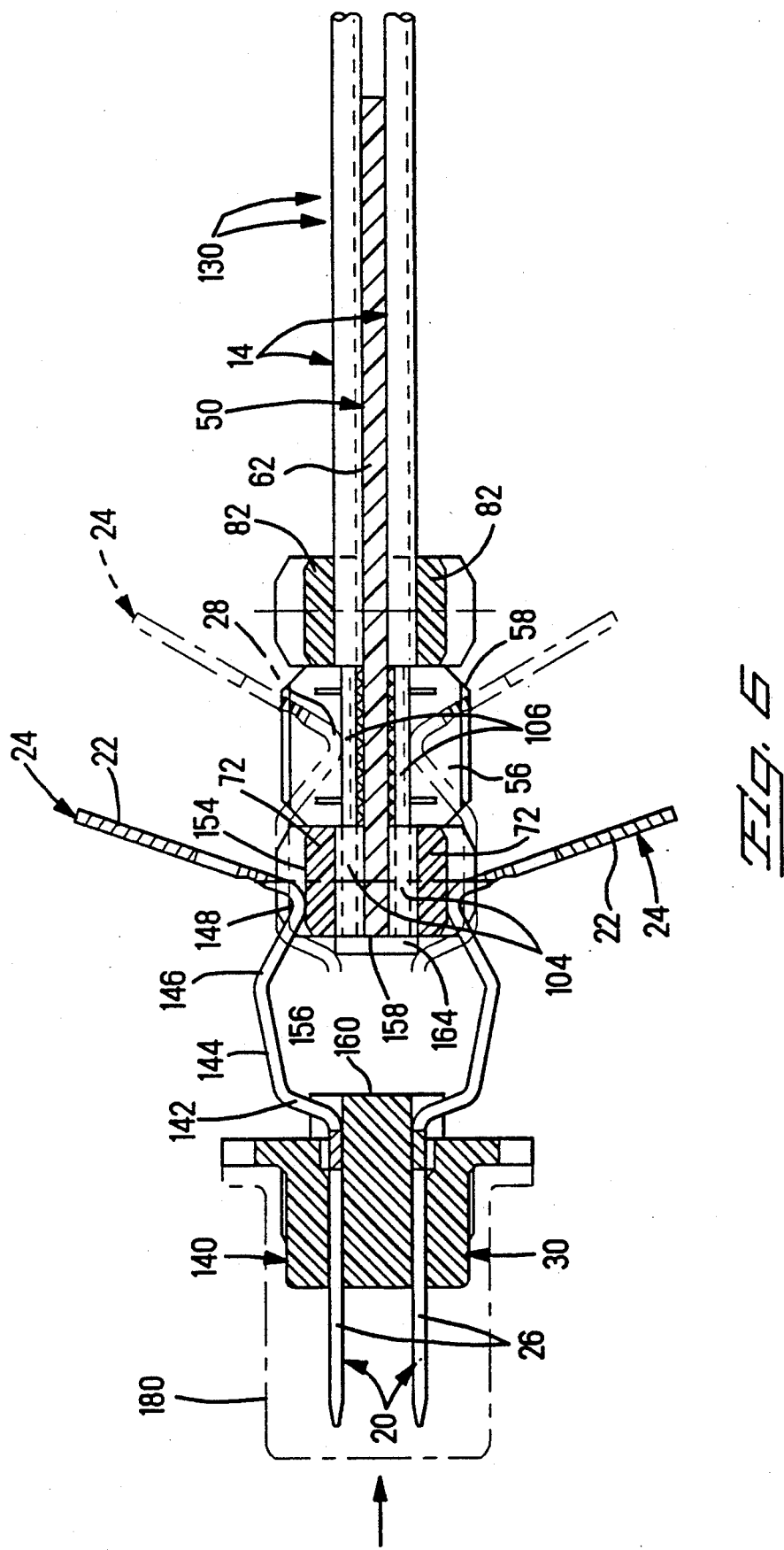

5,211,578

CONNECTOR HOUSING ASSEMBLY FOR DISCRETE WIRES

FIELD OF THE INVENTION

The present invention relates to the field of electrical connectors and more particularly to connectors for application to multiple wires.

BACKGROUND OF THE INVENTION

Many electrical connectors are commercially available which are applied to a multiplicity of discrete cables, having an array of electrical terminals extending through passageways of the housing from terminations to the conductors of the wires forwardly to contact sections at least exposed across the mating face of the connector housing for mating with corresponding terminals of a mating connector. Commonly application apparatus for assembling such connectors to the wires utilizes tooling which is relatively complex in order to handle the end portions of the discrete wires for precise placement, and commonly the terminals are applied to the wires by crimping after which the thusterminated wires are moved axially forwardly for the terminals to be extended through the passageways of the housing until fully seated therewithin.

In another style the terminals are previously assembled into the housing with rearward sections exposed along a common face of the housing, and the wires are positioned laterally beside transverse slotted beams of the terminal rearward ends and are urged laterally into the slotted beams which penetrate the wire insulation and engage the conductors therewithin for termination, after which a cover is fastened to the housing for insulation and protection. A similar connector assembly is disclosed in U.S. patent application Ser. No. 07/750,778 filed Mar. 31, 1989 and assigned to the assignee hereof, in which the cover includes a fluted wire-engaging inner surface to engage the wire ends and urge them into the slotted beams until terminated, with the cover securing itself in place to the housing.

In yet another approach, for multistrand conductors of 28 AWG twisted pair wires of a bundled cable, the stripped conductors of the plurality of wires are soldered to traces of a paddle card or transition card, which traces extend to a common forward edge and are then soldered to terminals of a connector for electrical connection thereto, and cover members are secured thereover. Similar such arrangements are disclosed in U.S. Pat. Nos. 4,679,868 and 4,682,828. In a variation of this arrangement, U.S. Pat. No. 4,871,319 discloses a molded paddle card whereon discrete traces extend from the forward card edge to molded wire-receiving grooves adapted to receive stripped wire ends thereinto for soldering, after which the paddle card is fastened to a connector having terminals secured therein solderable to the card's traces.

It is desired to provide a method of terminating a plurality of insulated small gage stranded wires and assembling a connector thereto.

It is desired to provide a housing assembly which is adapted to facilitate termination to discrete wires, wherein the termination of the terminals to the conductors is by soldering rather than crimping or insulation displacement.

It is desired to provide a housing assembly having components which are adapted for receipt of the discrete wire ends and further handling thereof as a unit during solder termination.

SUMMARY OF THE INVENTION

In the present invention a body member of the housing includes an array of axially extending grooves defined on each side surface thereof for receipt of wire ends moved thereinto from laterally of the side surface, a planar front support ledge extending just forwardly of the groove array, and a planar rear support section extending from rearward ends of the grooves to a rearward end. Positioned just forwardly and rearwardly of the wire-receiving grooves extending outwardly from each lateral end of the planar front support ledge and rear support section of the body member are a pair of forward and rearward apertured mounting flanges. A pair of forward clamping bars and a pair of rearward clamping bars will be assembled to the body member when securing the wire ends in the respective grooves, having projections at each end adapted to be received through the corresponding apertured mounting flange in an interference fit.

Each wire end is prepared by carefully slitting the insulation around the conductor at a selected distance from the end, moving the slitted insulation piece along the conductor and remaining partially thereon, forwardly to expose a selected length of the conductor, after which that portion of the insulation piece forwardly of the conductor end is severed. The prepared wire ends are then positioned in respective grooves of the body member with the exposed conductor length disposed within and along the respective groove, the insulated end portion disposed along a ledge of the body member forwardly of the groove array, a clamping bar mounted onto the body member clamping the insulated wire ends against the ledge, the insulated remaining portions of the wire disposed along the planar rear support surface and a clamping bar mounted onto the body member clamping the insulated wire thereagainst, all defining a wire carrier manipulatable as a unit for remaining assembly steps and wire termination.

The terminals are stamped and formed from a blank and initially retained integrally joined to a carrier strip defining a lead frame, one such lead frame for the upper row and a second for the lower row. Contact sections of the terminals of both rows are inserted forwardly through passageways of a common transverse front cover member until widened body sections of the terminals are disposed within the passageways in an interference fit, thus defining a connector subassembly. Intermediate sections of the terminals of the lead frames exit the rearward ends of the passageways and initially diverge from the medial plane of the front cover member dividing the rows, then extend axially and then begin converging toward the intermediate sections of the terminals of the other lead frame, to axially extending wire termination sections of the terminals. Rear sections of the terminals diverge from the termination sections to frangible sections joining the terminals to the respective carrier strip of the lead frame.

The wire carrier can now be moved axially forwardly between the lead frames secured to the front cover member, with chamfered forward edges of the forward clamping bars initiating outward deflection of the lead frames upon engagement with the rear terminal sections. The wire terminations sections of the terminals ride over the forward clamping bar until therepast, resiling into respective ones of the grooves of the body member and press against the exposed conductor portion lying therealong. Preferably a preform of solder is disposed along the groove bottom surfaces prior to clamping of the wires to the body member. Also, preferably, the carrier strips of the terminal lead frames each define a Curie point heater or self-regulating temperature source by including an incremental layer of magnetic material intimately joined to the copper alloy of the lead frame; such a Curie point heater when subjected to radio frequency current of constant amplitude induced therein, will generate thermal energy to reflow the solder after flux is applied. Thereafter, the carrier strips are broken off defining discrete circuits. After soldering and carrier strip removal, additional insulative covering can be applied if desired; for example the flanges of the forward and rearward clamping bars and the associated mounting flanges of the body member can include aligned mounting apertures into which projections of outer cover members can be inserted in interference fit.

The connector subassembly/wire carrier is thus especially adapted to facilitate not only handling of a plurality of terminals and handling of a plurality of discrete wires, but also soldering of the wires to the terminals, especially valuable for terminating multistrand conductors.

It is an objective of the present invention to provide a connector assembly adapted to facilitate handling of discrete wires with minimal complex tooling.

It is also an objective to provide such an assembly adapted for handling a plurality of terminals prior to termination to respective wires.

It is an additional objective to provide such an assembly adapted for soldering of conductors of discrete wires to respective terminals after connector assembly.

Embodiments of the present invention will now be described by way of example with reference to the accompanying drawings.

BRIEF DESCRIPTION OF THE DRAWINGS

FIGS. 3 and 4 are elevation views illustrating the preparation of a wire and assembling of the wire to the organizer of the present invention;

FIGS. 5 to 7 are longitudinal section views illustrating assembling of the wire carrier subassembly to the connector subassembly, with FIG. 7 also showing placement of the coil of an RF apparatus therearound for activating the Curie point heater defined on the terminal carrier strips, and also removal of a carrier strip after soldering is completed.

DETAILED DESCRIPTION OF THE PREFERRED EMBODIMENTS

Figure 1:
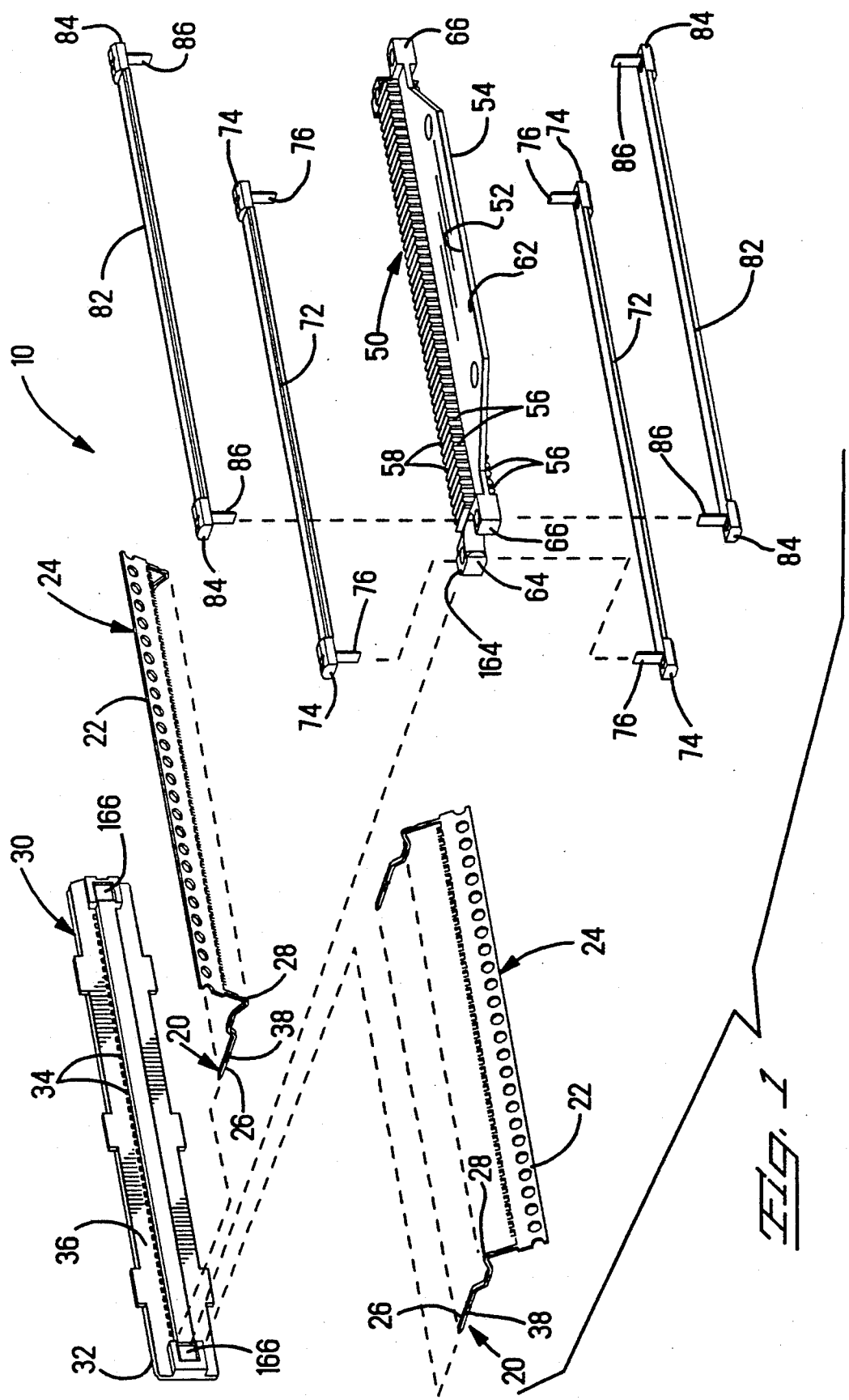
FIGS. 1 and 2 are isometric views, exploded and assembled, of an electrical connector including the present invention, with FIG. 2 also showing a bundled cable with representative discrete wires extending therefrom and terminated in the connector.
Figure 2:
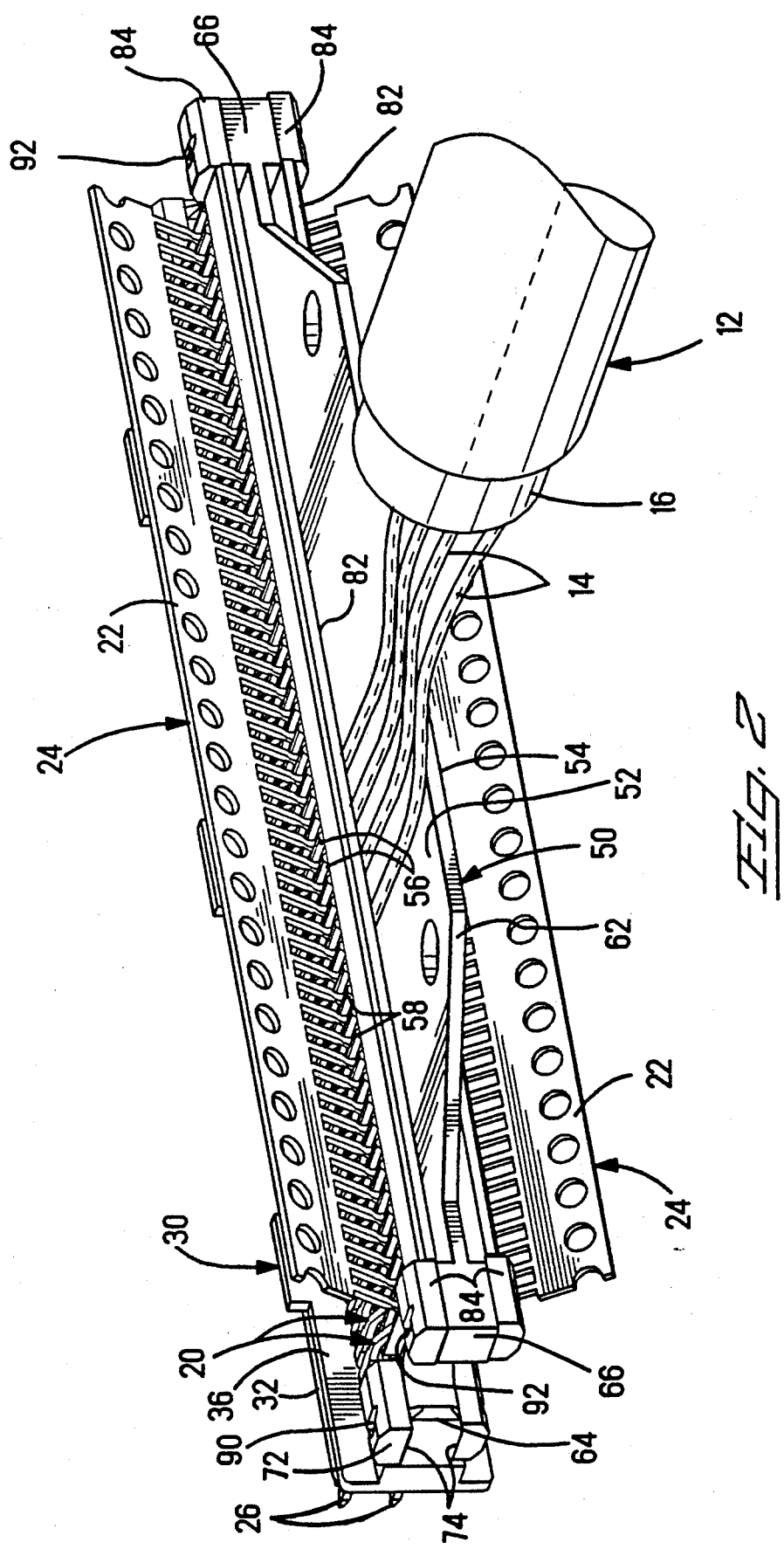
Figure 7:
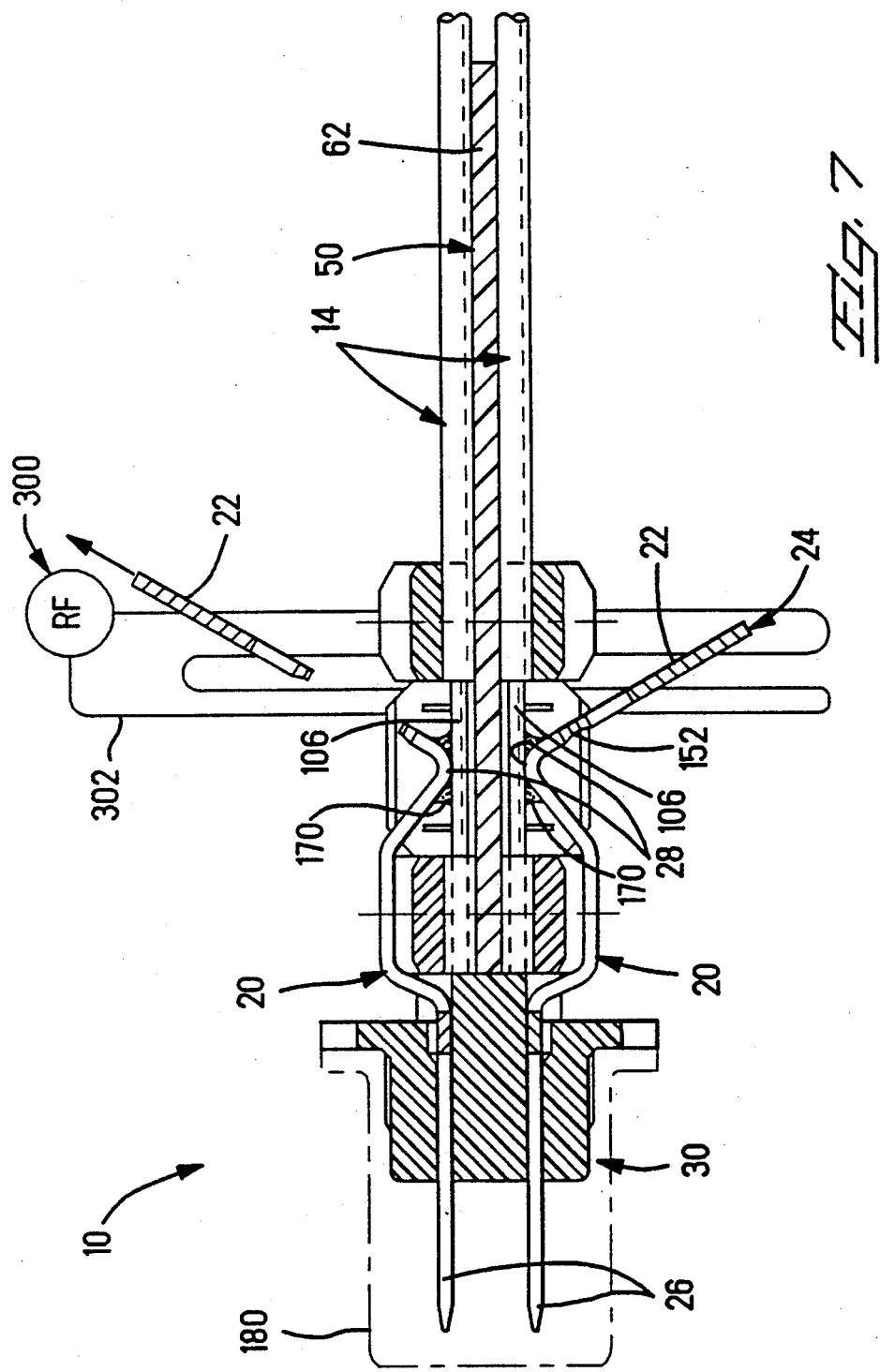

FIG. 1 illustrates the components of connector assembly 10, which are assembled in FIG. 2 and about to be terminated by soldering to an array of discrete wires 14 such as 28 AWG twisted pair wires extending from a bundled cable 12. Shield braid 16 of cable 12 is exposed for termination such as to a metal shell to surround the connector (not shown). Wires 14 may have solid strand conductors, or they may have multistrand conductors for which the present invention is especially suitable. Terminals 20 for the respective conductors of wires 14 are arranged in two rows, and the terminals of each row initially are joined at their rearward ends to a carrier strip 22 to define a lead frame 24. Terminals 20 each have a contact section 26 at the forward end thereof and a termination site 28 near the carrier strip 22. Front cover member 30 is essentially a transverse member the forward surface of which defines the connector mating face 32, and includes passageways 34 extending from the mating face to a rearwardly facing surface 36 and having entrances adapted to receive the contact sections of the respective terminals insertably therethrough and widened body sections 38 of terminals 20 in interference fit therewithin to define a connector subassembly 140 (FIGS. 5 to 7).

Body member 50 includes upwardly facing surface 52 and downwardly facing surface 54 each having an array of wire-receiving grooves 56 disposed laterally therealong separated by barrier walls 58. Extending forwardly from the arrays of grooves is a front support ledge 60; extending rearwardly from the arrays of grooves is a rear support section 62. Laterally of front support ledge 60 (see FIGS. 4 to 7) and rear support section 62 extend front and rear mounting flanges 64,66 respectively each having at least one projection-receiving aperture 68,70 extending vertically therethrough respectively. Associated with front support ledge 60 are upper and lower forward clamping bars 72 having flanges 74 at respective ends thereof from which depend mounting projections 76 such as semicylindrical legs adapted to be received into respective projection-receiving apertures 68 in an interference fit. Similarly, associated with rear support section 62 are upper and lower rearward clamping bars 82 having flanges 84 at respective ends thereof from which depend mounting projections 86 such as semicylindrical legs adapted to be received into respective projection-receiving apertures 70 in an interference fit. Forward and rearward clamping bars 72,82 may be identical as shown.

Preferably, referring to FIG. 2, the superposed mounting flanges 74,64,74 and 84,66,84 additionally define together second apertures 90,92 whereinto may be inserted projections of outer upper and lower dielectric cover members (not shown) having mounting projections adapted to be received thereinto in interference fit, after all assembly and soldering has been performed. Additionally, rear support section 62 may include apertures 94 by which cable strain relief clamps (not shown) or rear shell members (not shown) may be mounted thereto.

The preparation of a wire 14 is illustrated in FIG. 3. Each wire 14 is prepared by carefully slitting insulative jacket 100 thereof at a selected location inward from end 102 thereof, and the thus-loosened piece 104 is slid partially forwardly along conductor 106 exposing a portion 108 of conductor 106 having a selected length. The portion 110 of the insulation piece 104 forwardly of end 102 is removed, retaining a remnant of piece 104 on the end of conductor 106.

The securing of wires 14 to body member 50 is shown in FIG. 4 following preparation. Exposed conductor portion 108 is aligned with a corresponding groove 56, with insulative piece 104 beside front support ledge 60 and the insulatively jacketed remainder of wire 14 extending along rear support section 62. Chamfered outer edges 120 of barrier walls 58 are adapted to receive conductor portions 108 appropriately into groove 56 until the wire insulation forwardly and rearwardly of portion 108 abuts the surface of body member 50 along front support ledge 60 and rear support section 62. Preferably vertical rib sections 122 are formed along side surfaces of walls 58 to assist in centering wire conductors 106 within grooves 56. Previously disposed along the bottom surface of each groove 56 is an amount of solder or solder paste 124. When all wires 14 are positioned appropriately along respective grooves 56, upper and lower front clamping bars 72 are mounted onto body member 50 outwardly of front support ledge 60 with projections 76 entering apertures of mounting flanges 64; and upper and lower rear clamping bars 82 are similarly mounted onto body member 50 outwardly of rear support section 62 immediately rearwardly of barrier walls 58 all defining a wire subassembly or carrier 130.

FIGS. 5 to 7 illustrate the assembling of wire carrier 130 to connector subassembly 140, which is shown to have a metal shroud 180 (in phantom) conventionally secured to front cover member 130 as preferred to which a pair of rear shell members (not shown) will be fastened upon final connector assembly after soldering. Each terminal 20 of each lead frame 24 includes an intermediate section extending rearwardly from body section 38 and exiting a respective passageway 34 of front cover member 30, with a first portion 142 diverging outwardly from the median of subassembly 140, a second portion 144 extending axially, and a third portion 146 converging to wire termination section 28 at acute bend 148. Rear section 150 includes a frangible section 152 initially joining terminal 20 to carrier strip 22. Together the wire termination sections 28 of the terminals of the upper and lower lead frames 24 define a constriction having an opening dimensioned less than the distance between the outwardly facing surfaces 154 of upper and lower front clamping bars 72 of wire carrier 130. Preferably outwardly facing surfaces 154 have at least their forward edges 156 chamfered, and upon wire carrier 130 being moved axially between the lead frames bearing engagement between chamfered edges 156 and rear terminal sections 150 of both lead frames initiates outward deflection of the lead frames.

In FIG. 6 can be seen an intermediate position during assembly, with lead frames 24 deflected or pried apart as wire termination sections 28 ride over outwardly facing surfaces 154 of forward clamping bars 72. Shown in phantom is the final position of wire termination sections 28 after receipt into corresponding grooves 56 and engagement with corresponding conductors 106 of wires 14 after the deflected terminal portions resile. It is preferred that the lead frames 24 and front cover member are so shaped and dimensioned that the wire engagement sections 28 will apply spring bias against the conductors in the final position, thus assuring optimum conditions for soldering therebetween.

Referring to FIGS. 6 and 7, forward surface 158 of front support ledge in common with the forward surfaces of clamping bars 72 and insulation pieces 104 abut the rearwardly facing surface 160 of flange 162 of front cover member 30; embossments 164 extend forwardly from body member 50 at each lateral end to enter corresponding holes 166 along rearward face 36 of front cover member 30 (FIG. 1). Termination section 28 of each terminal 20 is spring loaded against a corresponding conductor 106 of wire 14. The assembly is placed within a coil 302 of an apparatus 300 for generating radio frequency current of constant amplitude such as 13.56 mega Hertz. Carrier strips 22 include a layer of metal having high magnetic permeability and high electrical resistance, such as Alloy 42 (42 percent nickel, 58 percent iron) of a thickness of between about 0.0003 and 0.0007 inches, such as by being clad onto the surface of carrier strip 22 which comprises preferably copper alloy such as Alloy No. C511000, phosphor bronze. Upon flux being applied to the termination sites in grooves 56, and upon the carrier strips being subjected to RF current for several seconds, the Curie point heater defined by each carrier strip 22 achieves a temperature of about 240° C. and conducts thermal energy along rear section 150 of terminals 20 to termination sections 28 to reflow solder 124 to form solder joints 170 between terminals 20 and conductors 106. Solder 124 can be for example Sn 63 tin-lead having a reflow temperature of about 183° C. Such Curie point heating by self-regulating temperature sources is disclosed in U.S. Pat. Nos. 4,852,252; 4,256,945 and 4,659,912, and RF generators are disclosed in U.S. Pat. Nos. 4,626,767 and 4,789,767. Localized heating of carrier strips 22 and only the vicinity adjacent exposed conductor portions 108 for several seconds needed to reflow the solder has the important benefits of the controlled maximum temperature in a highly localized area for a very brief time, minimizing any adverse effect of heat on the wire insulation for example.

What is claimed is:

1. An electrical connector assembly for termination to ends of a plurality of discrete insulated conductor wires to define a wire harness, comprising:

a dielectric front cover member having a plurality of passageways extending therethrough from a rearward face to a mating face;

a plurality of signal terminals having contact sections at forward ends forwardly of body sections thereof adapted to be inserted from said rearward face through respective ones of said passageways for said contact sections to be at least exposed along said mating face for electrical connection with a corresponding electrical article, each said signal terminal including an intermediate section extending rearwardly from said body section to a bend section and to a rear section including a frangible section therealong;

said signal terminals arrayed in two rows, said signal terminals of each said row initially being joined to a carrier strip to define a pair of lead frames, said signal terminals of each said lead frame upon being inserted into said front cover member being formed so that said rear sections extend from said bend sections diverging outwardly away from the other said lead frame, with said bend sections being arrayed in opposing rows and defining a wire-receiving constriction therebetween upon said signal terminals being secured in said front cover member to form a connector subassembly;

a dielectric body member adapted to be mounted to said front cover member upon connector assembly, said body member including a planar section extending to a rearward end and including a transverse array of axially oriented wire-receiving grooves across an upper major surface and across a lower major surface corresponding to locations of said signal terminals in said connector subassembly, and further including a front support ledge forwardly of said grooves and a rear support section rearwardly of said grooves, said body member including a pair of mounting flanges laterally of said front support ledge and laterally of said rear support section;

a pair of upper and lower forward clamping bars associated with said front support ledge and including mounting flanges at lateral ends thereof adapted to cooperate with said body member mounting flanges to secure said upper and lower clamping bars to said body member; and a pair of upper and lower rearward clamping bars associated with said rear support ledge and including mounting flanges at lateral ends thereof adapted to cooperate with said body member mounting flanges to secure said upper and lower clamping bars to said body member, whereby ends of said wires having insulated conductor ends forwardly of stripped conductor portions of selected length, are securable to said body member by their stripped conductor portions being disposed along respective said grooves and said forward clamping bars being secured to said body member pressing said insulated conductor ends to said front support ledge along said upper and lower major surfaces and said rearward clamping bars being secured to said body member pressing insulated remaining portions of said wires to said rear support section, with said stripped conductor portions exposed along said grooves, defining a wire-carrying subassembly movable forwardly into said constriction between said opposing bend sections for soldering of said intermediate sections of said signal terminals to respective said stripped conductor portions, defining a connector assembly.

2. A connector assembly as set forth in claim 1 wherein said forward clamping bars are chamfered at front edges of outwardly facing surfaces to bear against said bend sections during assembling said wire-carrying subassembly to said connector subassembly, to initiate outward deflection of said rear sections of said signal terminals until said bend sections are axially opposed to said stripped conductor portions, whereupon said rear sections resile into said grooves and press against said stripped conductor portions.

3. A connector assembly as set forth in claim 1 wherein said mounting flanges of said forward and rearward clamping bars include projections adapted to be received into apertures through said mounting flanges of said body member in interference fit.

4. A connector assembly as set forth in claim 1 wherein each said carrier strip includes a first layer of a first metal having low magnetic permeability and low electrical resistance, and a second layer intimately joined to said first layer of a second metal having high magnetic permeability and high electrical resistance and having a thickness of between 0.0003 and 0.0007 inches.

5. A wire-carrying subassembly mountable to a rearward face of a connector subassembly having upper and lower rows of signal terminals all having rearward sections extending rearwardly to be electrically connected to conductors of discrete wires, the wirecarrying subassembly comprising:

a dielectric body member adapted to be mounted to said connector subassembly, said body member including a planar section extending to a rearward end and including a transverse array of axially oriented wire-receiving grooves across an upper major surface and across a lower major surface corresponding to locations of said signal terminals in said connector subassembly, and further including a front support ledge forwardly of said grooves and a rear support section rearwardly of said grooves, said body member including a pair of mounting flanges laterally of said front support ledge and laterally of said rear support section;

a pair of upper and lower forward clamping bars associated with said front support ledge and including mounting flanges at lateral ends thereof adapted to cooperate with said body member mounting flanges to secure said upper and lower clamping bars to said body member; and a pair of upper and lower rearward clamping bars associated with said rear support ledge and including mounting flanges at lateral ends thereof adapted to cooperate with said body member mounting flanges to secure said upper and lower clamping bars to said body member, whereby ends of said wires having insulated conductor ends forwardly of stripped conductor portions of selected length, are securable to said body member by their stripped conductor portions being disposed along respective said grooves and said forward clamping bars being secured to said body member pressing said insulated conductor ends to said front support ledge along said upper and lower major surfaces and said rearward clamping bars being secured to said body member pressing insulated remaining portions of said wires to said rear support section, with said stripped conductor portions exposed along said grooves, defining a wire-carrying subassembly.

6. A wire-carrying subassembly as set forth in claim 5 wherein said forward clamping bars are chamfered at front edges of outwardly facing surfaces to bear against said bend sections during assembling said wire-carrying subassembly to said connector subassembly, to initiate outward deflection of said rear sections of said signal terminals until said bend sections are axially opposed to said stripped conductor portions, whereupon said rear sections resile into said grooves and press against said stripped conductor portions.

7. A wire-carrying subassembly as set forth in claim 5 wherein said mounting flanges of said forward and rearward clamping bars include projections adapted to be received into apertures through said mounting flanges of said body member in interference fit.

* * * * *